Dec. 27, 1966  P. M. FIELD ET AL  3,294,966
AUTOMATIC LAMP CHANGING APPARATUS
Filed Aug. 24, 1964  4 Sheets-Sheet 1

PHILIP M. FIELD and
ROBERT N. ROSS
INVENTORS

BY Rudolph J. Quick
ATTORNEY

Dec. 27, 1966 P. M. FIELD ETAL 3,294,966
AUTOMATIC LAMP CHANGING APPARATUS
Filed Aug. 24, 1964 4 Sheets-Sheet 2

PHILIP M. FIELD and
ROBERT N. ROSS
INVENTORS

BY Rudolph J. Smick
ATTORNEY

Dec. 27, 1966 P. M. FIELD ET AL 3,294,966
AUTOMATIC LAMP CHANGING APPARATUS
Filed Aug. 24, 1964 4 Sheets-Sheet 4

PHILIP M. FIELD and
ROBERT N. ROSS
INVENTORS

BY
*Rudolph J. Zwick*
ATTORNEY

United States Patent Office 3,294,966
Patented Dec. 27, 1966

3,294,966
AUTOMATIC LAMP CHANGING APPARATUS
Philip M. Field, Maplewood, and Robert N. Ross, Jackson, N.J., assignors to Charles Beseler Company, East Orange, N.J., a partnership
Filed Aug. 24, 1964, Ser. No. 391,539
17 Claims. (Cl. 240—37.1)

This invention relates to a lamp changing apparatus and more particularly to apparatus for automatically replacing a lamp in an operating station in a piece of apratus.

Although lamp changing apparatus made in accordance with this invention is of general utility, it is particularly advantageous for use in a class of projectors known as overhead projectors. Such projectors are designed for use by a teacher, or lecturer, at the front of a room and they are arranged to project a picture over his head onto a vertical screen disposed at the front of the room, thereby permitting the speaker to face the audience while the latter faces the screen.

Briefly, an overhead projector comprises a projection head slidably carried by a vertical post extending from the projector housing. The housing carries the projection lamp and the necessarily associated components of the optical system. Generally, the lamp is positioned proximate to the bottom of the housing and is removably carried by sockets which serve to connect the lamp into an electrical circuit as well as to position the lamp properly in the optical system of the projector.

Projection lamps operate at relatively high temperatures and have a relatively short, useful life. This is particularly true in the case of a tungsten iodine lamp which is finding increasing use in photographic apparatus of the type under discussion. Consequently, should the lamp burn out during actual use of the projector, it cannot immediately be replaced without danger of the operator burning his fingers. Alternatively, the lecture must be interrupted for a period of time sufficient to permit the lamp to cool down to a safe handling temperature.

An object of this invention is the provision of apparatus for changing a defective lamp positioned in an operating station within a piece of apparatus.

An object of this invention is the provision of apparatus for replacing a lamp disposed in an operating station within a housing, which apparatus is operable from the exterior of the housing.

An object of this invention is the provision of apparatus for supporting a lamp in an operating station by a pair of sockets, which apparatus is operable to disengage the sockets from the lamp, transport the lamp to a position removed from the operating station, inserting a replacement lamp in the operating station and establishing engagement between the replacement lamp and the sockets.

An object of this invention is the provision of apparatus comprising a pair of movable sockets, a pair of lamps carried by rotatable fingers, and a mechanism operable to position one or the other of the lamps in an operating station and to effect engagement thereof by the sockets.

An object of this invention is the provision of apparatus for supporting a lamp in an operating station within a housing, said apparatus comprising relatively movable socket means positioned to support a lamp in the operating station, a pair of lamps carried by individual fingers, a mechanism operable for positioning one or the other of the lamps in the operating station and in supportive engagement by the socket means, and means operable from the exterior of the housing for effecting operation of the mechanism.

An object of this invention is the provision of apparatus for supporting a lamp in an operating station, which apparatus comprises a pair of lamps, supporting means supporting the lamps in spaced, parallel relation, a pair of sockets movable from first positions wherein they support a lamp in the operating station to second positions wherein they are disengaged from the lamp, operating means operable to move the sockets between the first and second positions, and means positioning one or the other of the lamps in the operating station after which the sockets are moved from the second to the first positions.

These and other objects and advantages of the invention will become apparent from the following description when taken with the accompanying drawings. It will be understood, however, that the drawings are not to be construed as defining the scope or limits of the invention, reference being had for the latter purpose to the claims appended hereto.

In the drawings wherein like reference characters denote like parts in the several views.

Figure 1:
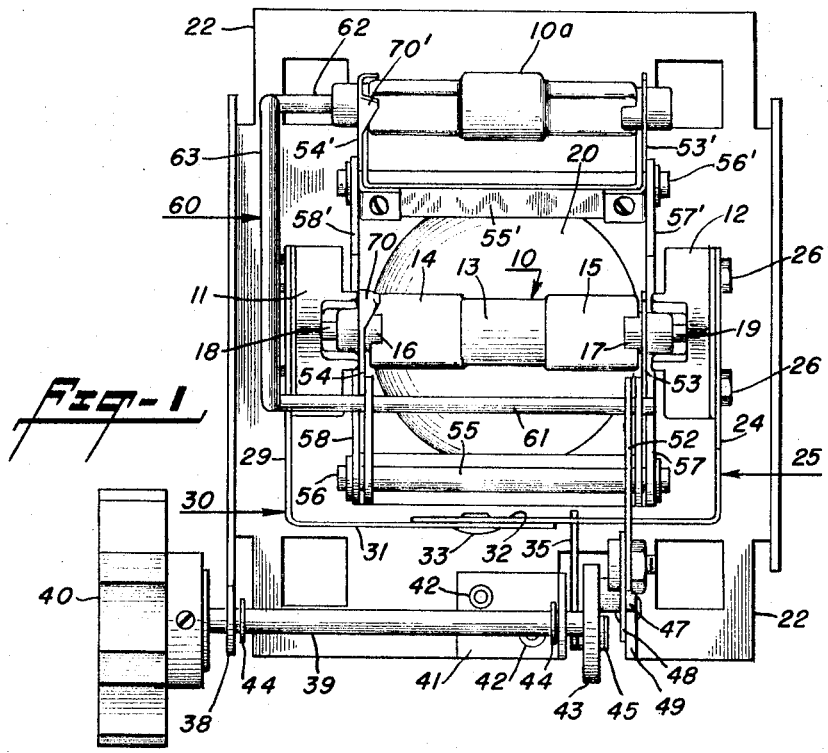
FIGURE 1 is a top plan view of apparatus made in accordance with this invention.
Figure 2:
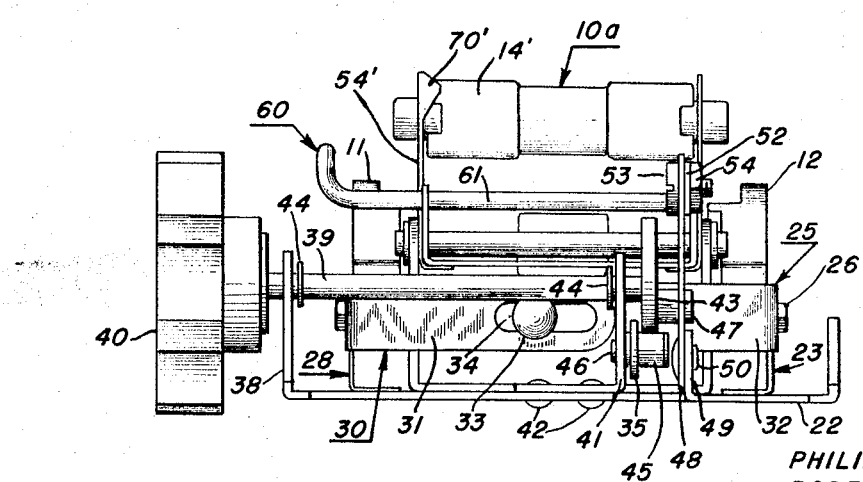
FIGURE 2 is an elevational view taken from the front of the apparatus.
Figure 3:
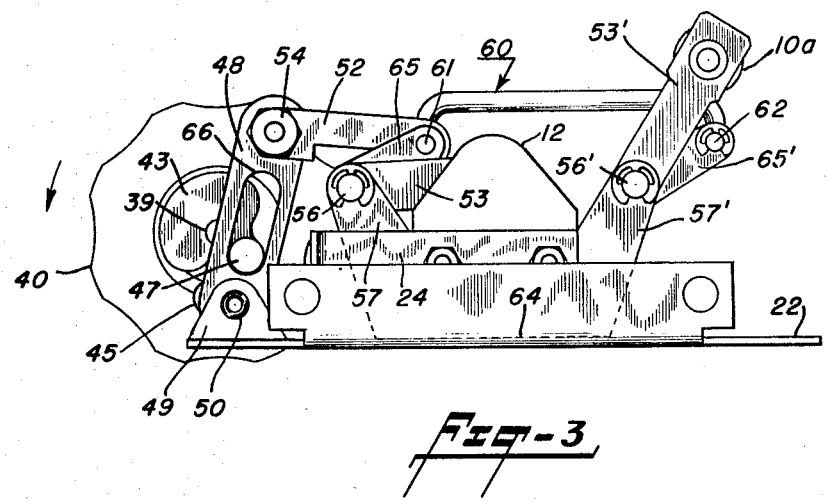
FIGURE 3 is an elevational view taken from the right side of the apparatus.

Reference now is made to FIGURES 1–3, wherein the lamp 10 is shown positioned in the operating station, which lamp is clampingly supported in such position by the spaced sockets 11 and 12, and a replacement lamp 10a spaced away from the operating station. The illustrated lamps are conventional tungsten iodine lamps, which lamps are suitable for use in any position but the lamp 10 is here shown operating in a horizontal position. Such lamp has a central, cylindrical portion 13, carrying the filament, and flattened, generally rectangular portions 14 and 15 carrying the ceramic tubes 16 and 17, respectively. These ceramic tubes carry axially-extending terminals for connecting the lamp filament into an electric circuit. The sockets 11 and 12, made of ceramic material, are provided with semi-circular recesses, open at the upper ends, for receiving the ceramic tubes of the lamp. Also, the sockets are provided with metal prods 18 and 19, which prods are constructed and arranged to engage the respective lamp terminals, thereby to support the lamp in a predetermined plane when the sockets engage the lamp ends, as shown. Although not shown in the drawings, each prod has a flexible lead connected thereto, whereby the lamp is connected to the electrical circuit.

Disposed below the lamp 10 is a concave light reflector 20, carried by a suitable support which is secured in fixed position on a platform 22. In the case of an overhead projector, those skilled in this art will know that the platform is secured in fixed position within the projector housing and that the reflector directs light rays upwardly through a Fresnel lens positioned beneath a horizontal projection stage. The lamp 10, then, is positioned in what may be termed the operating station, that is, it is properly positioned in the optical system of the particular apparatus.

Figure 5:
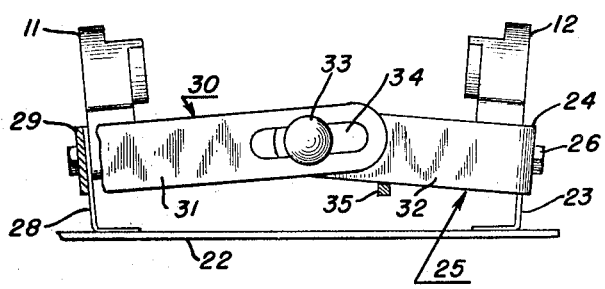
FIGURE 5 is a fragmentary front elevational view, with a portion in cross-section, showing the lamp sockets in the spread apart positions.

Referring now specifically to the lamp socket 12, this socket is secured to the upstanding leg of an L-shaped supporting bracket 23 which is welded, or otherwise secured to the platform 22, see particularly FIGURE 5.

Such upstanding leg and the socket, as well as the proximate portion 24 of an L-shaped, flat rod 25, are secured together by means of two screws and the nuts 26. The lower edges of the socket 12 and the flat rod portion 24 are spaced from the platform surface and the supporting bracket 23 is made of a suitable spring material, for purposes which will be described herein below.

The other socket 11 is similarly secured to the upstanding leg of a second supporting bracket 28 and the proximate portion 29 of a second L-shaped flat bar 30. The forward, or transverse portion 31, of the flat bar 30, overlaps the similar portion 32 of the flat bar 25. These portions are mechanically coupled together by means of a double-headed rivet 33 passing through a slot 34, formed in the portion 31, and a hole provided in the portion 32.

The operation of the mechanism described to this point will best be understood by reference to the fragmentary front view of FIGURE 5. Inasmuch as the supporting brackets 23 and 28 are made of spring material, the overlapping and pivotally-coupled front portions 31 and 32, of the flat bars, can be moved to the illustrated positions by means of the underlying actuating lever 35, thereby causing the sockets 11 and 12 to spread apart. In such spread-apart positions of the sockets they are electrically and mechanically disengaged from the lamp disposed in the operating station. Upon the removal of the upward force applied to the actuating lever 35, the spring action of the supporting brackets 23 and 28 causes the sockets to return to their original positions, as shown in FIGURES 1 and 2. In this position, the sockets are pressed against the lamp thereby supporting the lamp and establishing electrical connections thereto.

Referring to FIGURES 1 and 2, an upstanding arm 38, formed integral with the platform 22, is provided with a hole for receiving the operating shaft 39 having a knob 40 secured thereto. This shaft also passes through an aligned hole formed in the L-shaped bracket 41, which is secured in fixed position on the platform, as by the rivets 42. The operating shaft 39 has a cam 43 secured to the right end and is secured in place by a pair of slit spring washers 44. The actuating lever 35 has one end underlying the forward portion 32 of the flat bar 25, carries a roller 45 at the other end and is rotationally supported by a rivet 46 carried by the mounting bracket 41. A detailed description of the operating sequence of the mechanism will be given hereinbelow. At present, it is pointed out that the roller 45 engages the peripheral surface of the cam 43, such surface having a contour such that rotation of the knob 40 results in the depression of the roller, as viewed in FIGURE 2, thereby causing the actuating lever 35 to move the sockets to the spread apart position shown in FIGURE 5.

The cam 43 also carries a roller 47, which roller extends through a longitudinal slot formed in a crank arm 48, said crank arm having its lower end pivotally secured to an upstanding arm 49, of the platform 22, as by a double-headed rivet 50. This crank arm has its upper end pivotally coupled to a cross arm 52 by means of a suitable stud 53 and nut 54.

As shown in FIGURE 1, the lamp 10 is disposed in the operating station and is engaged by the sockets 11 and 12. Such lamp has its ceramic end tubes passing through aligned holes formed in a pair of spaced fingers 53 and 54 made of a suitable heat-resistant material such as, for example, Inconel. A replacement lamp 10a is similarly carried by the spaced fingers 53' and 54'. The latter fingers have offset ends riveted to the base portion of a rigid, U-shaped bar 55' provided with aligned holes for the shaft 56', which shaft also passes through aligned holes formed in the spaced ears of 57' and 58' of a U-shaped mounting bracket rigidly secured to the platform. The fingers 53 and 54, carrying the lamp 10, similarly have offset ends riveted to the rigid U-shaped bar 55, with the shaft 56 passing through aligned holes formed in the arms of the bar 55 and the spaced ears 57, 58 of the mounting bracket. Each of the shafts 56 and 56' are secured in position by slit washers disposed in circumferential grooves provided at the ends of the shafts. A rigid, unitary connecting bar 60 has one leg 61 passing through aligned holes formed in the spaced arms of the rigid U-shaped bar 55, a corresponding end 62 passing through aligned holes formed in the spaced arms of the similar bar 55', and a transverse, central portion 63 lying in a plane above that of the legs. The bar 60 serves to mechanically couple together the two generally similar component assemblies for supporting and transporting the two lamps. Such assemblies include the fingers 53 and 54, supporting the lamp 10, and the fingers 53' and 54' supporting the lamp 10a, said fingers being rotatable about the respective shafts 56 and 56'.

A better understanding of the lamp-supporting and transporting mechanism will be had by reference to the side elevational view of FIGURE 3. Here, are shown the two ears 57, 57' formed in the forward, upstanding portion of the U-shaped mounting bracket 64 that is secured in fixed position on the platform 22. The shaft 56 passes through aligned holes formed in the ear 57, the finger 53 (which is one of the fingers carrying the lamp disposed in the operating station) and the forward arm 65 of the rigid U-shaped bracket to which the offset end of the finger 53 is riveted. The other shaft 56' passes through aligned holes formed in the ear 57', the finger 53' (which is one of the fingers carrying the replacement lamp) and the forward arm 65' of the rigid U-shaped bracket to which the offset end of the finger 53' is riveted. The two forward arms 65 and 65' are provided with holes for receiving the respective legs 61 and 62 of the connecting bar 60. The leg 61, of the connecting bar 60, also passes through a hole formed in the cross bar 52, which cross bar is pivotally connected to the crank arm 48, said crank arm being pivotally connected to the upturned arm 49 (formed integral with the platform) by the rivet 50. The roller 47, carried by the cam 43, extends through the longitudinal slot 66 formed in the crank arm. Also visible in this view is the roller 45, carried at the end of the actuating lever and a portion of the operating shaft 39 having the cam and the knob 40 secured thereto.

In FIGURES 1–3, the lamp 10 is shown in the operating station and engaged by the lamp sockets, whereas the lamp 10a is positioned at a point removed from the operating station. Rotation of the knob 40, in the indicated direction, results in the disengagement of the sockets from the lamp 10, the replacement of such lamp by the lamp 10a and then the engagement of the sockets with the lamp 10a, as will now be described.

Figure 4:
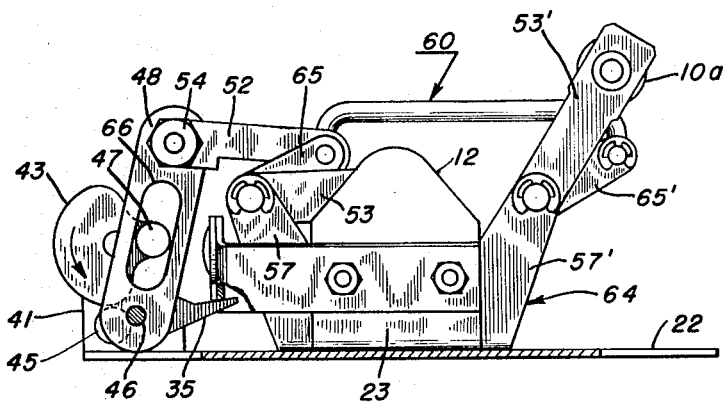
FIGURE 4 is a fragmentary view similar to FIGURE 3 but showing the position of the operating mechanism when the lamp sockets are spread apart.

FIGURE 4 is similar to FIGURE 3, but with the platform 22 shown in cross-section and the integral upstanding arm 49 removed to show the L-shaped bracket 41 having the actuating lever 35 pivotally secured thereto by the rivet 46. Also, in FIGURE 4, the cam 43 has been rotated some 30 degrees, thereby depressing the roller 45 and causing the actuating lever to elevate the overlying portions 31 and 32 of the flat bars, see, also, FIGURE 5. This causes the sockets to move apart and out of engagement with the lamp disposed in the operating station. During the initial rotation of the cam 43, the roller 47, carried by the cam, moves along the crank arm slot 66 without imparting significant pivotal movement to the crank arm.

Figure 6:
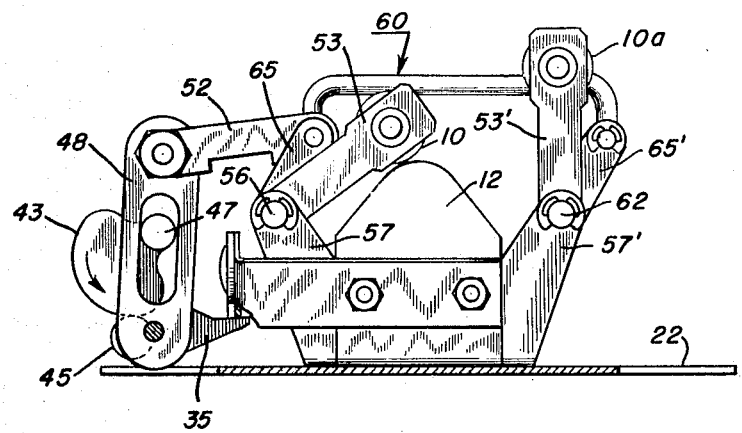
FIGURES 6–9 are views similar to FIGURE 4 and showing the operating mechanism in various positions for one cycle of operation.

In FIGURE 6, the cam 43 is shown rotated an additional 30 degrees, approximately. Since the actuating lever roller 45 is engaged by the constant radius portion of the cam, the lamp sockets remain in the spread apart positions. However, now the cam roller 47 has rotated the crank arm 48 in a counterclockwise direction about the axis of the rivet 50 (see FIGURE 3) resulting, effectively, in a movement of the cross arm 52 to the left. Such movement of the cross arm results in a rotation of the arm 65 and the lamp-carrying finger 53 about the shaft 56. A simultaneous rotation about the shaft 62 is imparted to the arm 66' and the lamp-carrying finger 53'. Thus, the lamp 10 is removed from the operating station and the lamp 10a is positioned substantially above the fixed arm 57'.

Figure 7:
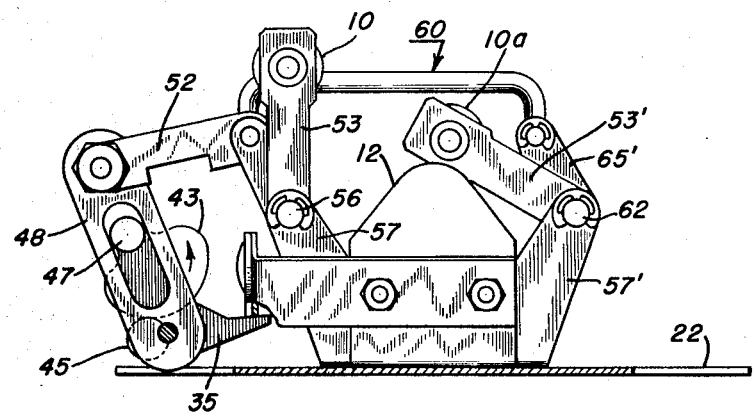
Figure 8:
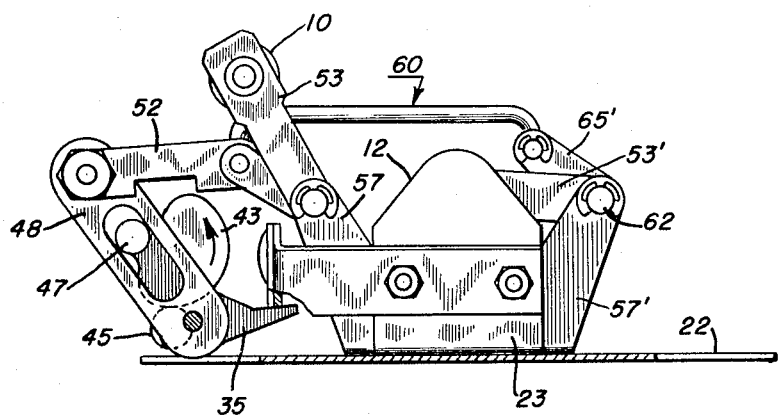
Figure 9:
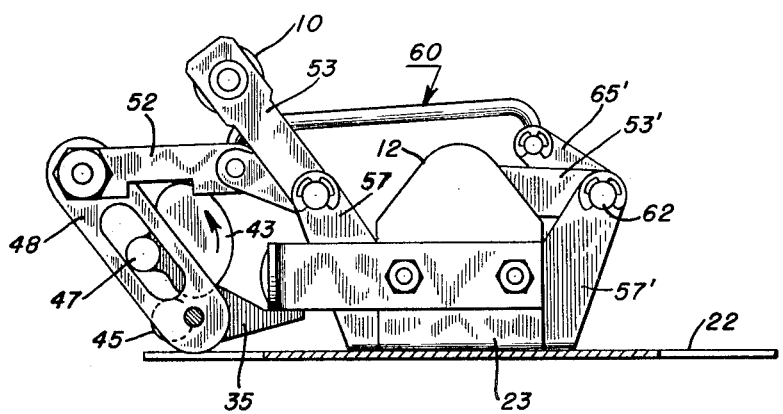

Upon further rotation of the cam, the lamps 10 and 10a are rotated, simultaneously, and correspondingly about their respective associated shafts 56 and 62, as shown in FIGURES 7 and 8. All the while, the actuating lever remains in fixed position, thereby retaining the sockets in the spaced-apart positions. As the crank arm 48 approaches the limit of the counterclockwise rotation, as shown in FIGURE 8, the fingers carrying the replacement lamp have been rotated about the shaft 62 to the point where such lamp is approaching the operating station, and the actuating lever roller 45 is approaching the end of the constant radius portion of the cam. From this point, further rotation of the cam results first in the pivotal movement of the crank arm 48 to its maximum position, as shown in FIGURE 9 (whereby the replacement lamp is positioned in the operating station), and then the constant radius portion of the cam passes out of engagement with the actuating lever roller 45. When this happens, the biasing forces provided by the L-shaped mounting springs 23 and 28, see FIGURE 5, move the sockets toward each other and into firm electrical and mechanical engagement with the ends of the replacement lamp.

If, now, the cam is rotated continuously in a clockwise direction, it will be apparent that the roller 45 will first be depressed to move the sockets to the spread-apart positions and out of engagement with the replacement lamp now positioned in the operating station, and then the crank arm 48 will be rotated in a clockwise direction back to the position shown in FIGURE 4. During such movement of the crank arm, the lamp 10 will replace the lamp 10a in the operating station, after which the sockets will come into engagement therewith.

Inasmuch as some tungsten iodine lamps are designed for operation in a position wherein the flattened end portions of the lamp lie in a predetermined plane, it is important that the fingers support the lamp in such manner as to assure a proper positioning of the filament when the lamp is disposed in the operating station. One arrangement for this purpose is shown in FIGURES 1 and 2, wherein the outer corners 70' of the finger 54' are offset inwardly at substantially a right angle to form a channel for receiving the flattened portion 14' of the lamp 10a. Similarly, one of the offset ends 70, of the finger 54', is visible in FIGURE 1. The spaced fingers for supporting each of the lamps preferably are made of a suitable heat-resistant material such as, for example, Inconel. Since the fingers are made of relatively thin, flat strips, they can be spread apart to insert the ceramic lamp ends through the aligned holes, formed in each set of the fingers, and to position the flattened lamp portion between the inwardly-directed offset edges formed on the one finger of each set. Thus, the lamp is firmly supported by the associated set of fingers and restrained against rotation so that when one or the other lamps is transported to the operating station, the flattened portions thereof will lie in a predetermined plane, which, in the case illustrated, happens to be horizontal.

In summary, rotation of the operating knob 40, in one or the other direction, results in the following sequence of operations:

(a) The lamp sockets are moved to the spread-apart positions and become disengaged, mechanically and electrically, from the lamp positioned in the operating station, whereby the lamp is supported by the two associated fingers, (b) The two sets of fingers are rotated simultaneously about their respective, fixed shafts, whereby the one lamp is removed from the operating station and replaced by the other lamp, (c) When the other lamp is positioned in the operating station, the sockets are returned to their original positions, thereby clampingly engaging the ends of such lamp.

It will be apparent that the entire lamp-supporting and lamp-changing apparatus can be secured in fixed position within a closed housing. In some photographic projectors, particularly those intended for use in schools where the projector is subject to tampering by the students, the operating knob 40 is located within the projector housing. In this case, the opening of the projector housing actuates a safety switch which disconnects the power from the lamp sockets so that replacement of the lamp in the operating station is accomplished when the electrical circuit is disconnected and, thus, without arcing.

Where desired, the need for opening the projector housing can readily be eliminated by extending the operating rod through an opening formed in the side wall of the housing so that the operating knob 40 is accessible from the outside. In this case, the main switch of the projector preferably should be turned off before replacing the lamp. Alternatively, a suitable safety switch can be incorporated, which switch will be actuated upon initial rotation of the knob, so that the electrical circuit automatically is disconnected until the lamp replacement is completed. Still further, a mechanical or electrical interlock of conventional type could be provided so that actuation of the knob 40 is not possible until the main switch is actuated to the "off" position.

As specifically disclosed herein, the lamp sockets are supported by individual brackets made of a spring material and arranged so that the sockets are biased toward each other, thereby to establish good electrical and mechanical engagement with the lamp positioned in the operating station. It will be apparent, however, the sockets can be pivotally-mounted and urged toward each other by a suitable spring or springs.

The relatively thin lamp-supporting fingers are subject to a certain amount of lateral flexing and the ceramic tubes of the supported lamp pass through clearance holes formed in the fingers, whereby the lamp is subject to a small amount of sliding movement relative to the fingers. Such arrangement results in a centering of the lamp by the sockets as they move into engagement therewith and permits modification of the described construction. Instead of both sockets being arranged for simultaneous movement away from and toward each other, one socket can remain stationary and only the other socket moved to effect the described engagement and disengagement of the lamp positioned in the operating station. Referring specifically to FIGURE 5, the flat bar 30 is omitted and the socket 11 either supported by the bracket 28, made of spring mtaerial, or supported on a heavier, non-flexible bracket. In either case, the actuating lever 35 effects the movement of the socket 12, as described. The slight axial movement of the lamp and/or the lateral flexing of the supporting fingers results in the unrestricted disengagement of the lamp end from the socket 11 as the lamp is transported out of the operating station and, similarly a proper positioning of the lamp relative to the socket 11 as the lamp is transported to the operating station.

Having now described the invention, those skilled in this art will be able to make various changes and modifications without thereby departing from the spirit and scope of the invention as recited in the following claims.

We claim:

1. Apparatus comprising,
   (a) a pair of lamps,
   (b) supporting means carrying the lamps in spaced parallel relation,
   (c) movable socket means normally disposed in a first position to engage a lamp positioned in a predetermined operating station, said socket means being movable to a second position out of engagement with such lamp, and (d) operating means moving the socket means between the first and second positions and thereafter moving said supporting means to alternately position the lamps in the operating station during each complete cycle of movement of said socket means.

2. Apparatus comprising,
(a) a pair of lamps,
(b) pivotally-mounted means carrying the lamps for rotation about spaced parallel axes, with one lamp positioned in an operating station and the other lamp remote from such station,
(c) a pair of sockets spaced along an axis lying between the axes of the said pivotally-mounted means, said sockets being in engagement with the said one lamp,
(d) means mounting the sockets for relative movement away from and toward each other, and
(e) actuating means mechanically coupled to the said pivotally-mounted means and to at least one of the sockets, said actuating means first effecting relative movement of the sockets away from each other, then rotating the pivotally-mounted means in a direction to substitute the said other lamp for the said one lamp, and thereafter effecting relative movement of the sockets toward each other and into engagement with the said other lamp.

3. The invention as recited in claim 2, wherein the lamps are of the double-ended type with a filament contact at each end, wherein each socket includes contact elements which engage the filament contacts, and wherein the said pivotally-mounted means comprises two sets of spaced, resilient fingers, each set of fingers carrying a lamp.

4. The invention as recited in claim 3, wherein at least one finger of each set includes means for retaining the lamp in a predetermined orientation relative to an associated set of fingers.

5. Apparatus comprising,
(a) a pair of axially-spaced sockets,
(b) mounting means supporting the sockets for movement thereof between first positions wherein the sockets engage a lamp in an operating station to second positions wherein the sockets are spaced from such lamp,
(c) a first set of resilient fingers carrying a first lamp,
(d) a second set of resilient fingers carrying a second lamp,
(e) means pivotally supporting each set of fingers for rotation about separate, parallel axes positioned on opposite sides of the socket axis,
(f) a manually-operable operating member, and
(g) actuating means mechanically coupled to the said operating member, said actuating means moving the sockets between the first and second positions and thereafter rotating both sets of fingers in a direction to position one or the other of said lamps in the operating station when the sockets are in the second positions, after which the sockets are returned to the first positions.

6. The invention as recited in claim 5, wherein the said lamps are of the double-ended type with a filament contact at each end, wherein the sockets include contact elements which engage the filament contacts when the sockets are in the first positions, and wherein at least one finger of each set includes locating means retaining the lamp in a predetermined orientation relative to the associated set of fingers.

7. The invention as recited in claim 5, wherein said operating member is a rotatable shaft carrying a cam and wherein said actuating means is actuated by the cam upon rotation of the said shaft.

8. The invention as recited in claim 5, wherein the said operating member is a rotatable shaft carrying a cam, wherein the sockets are mounted for pivotal movement between said first and second positions, and wherein the actuating means for moving the sockets between the first and second positions comprises a pair of bars each having an end secured to a socket; means pivotally coupling the bars together along an axis lying substantially midway between the sockets, and an actuating lever movable by the cam upon rotation of said shaft to rotate the said bars about their pivot axis.

9. The invention as recited in claim 8, wherein the actuating means for simultaneously rotating both sets of fingers comprises a pivotally-mounted crank arm rotatable by said cam; and a cross bar pivotally connected to the crank arm and mechanically coupled to both sets of the fingers.

10. Apparatus comprising,
(a) a pair of axially-spaced sockets,
(b) mounting means individually supporting the sockets for pivotal movement between first positions wherein the sockets engage a lamp positioned in an operating station to second positions wherein the sockets are disengaged from such lamp,
(c) a pair of bars having front portions extending substantially along the socket axis and pivotally coupled together, each bar having a side portion secured to a socket,
(d) first and second shafts secured in fixed positions on opposite sides of the socket axis and parallel thereto,
(e) a first set of spaced fingers rotatable about the said first shaft and carrying a first lamp positioned in the operating station,
(f) a second set of spaced fingers rotatable about the said second shaft and carrying a second lamp positioned away from the operating station,
(g) means mechanically coupling together the two sets of fingers for simultaneous rotation about their respective shafts,
(h) a rotatable operating shaft carrying a cam,
(i) a pivotally mounted actuating lever rotatable by the cam and having an end underlying the front portion of one of the said bars, and
(j) a pivotally mounted crank arm rotatable by the cam and pivotally coupled to one of the said sets of fingers,
  the arrangement being such that rotation of the cam rotates the actuating lever to displace the front portions of the said bars, thereby moving the sockets to the second positions, and then rotates the said crank arm to thereby replace the first lamp by the second lamp.

11. The invention as recited in claim 10, wherein the said mounting means are made of spring material and bias the sockets to the said first positions.

12. The invention as recited in claim 11, wherein at least one finger of each set includes means retaining the associated lamp in a predetermined orientation relative to the fingers.

13. The invention as recited in claim 11, wherein the lamps are of the double-ended type with an electrical contact at each end, and wherein each socket includes a contact tip for engaging the associated lamp contact when the sockets are in the first positions.

14. The invention as recited in claim 11, wherein the said actuating lever carries a first roller for engagement by the peripheral surface of the cam, and wherein the cam carries a second roller extending through a longitudinal slot formed in the crank arm.

15. The invention as recited in claim 10, wherein at least one finger of each set includes means retaining the associated lamp in a predetermined orientation, relative to the fingers.

16. The invention as recited in claim 10, wherein the lamps are of the double-ended type with an electrical contact at each end, and wherein each socket includes a contact tip for engaging the associated lamp contact when the sockets are in the first positions.

17. The invention as recited in claim 10, wherein the said actuating lever carries a first roller for engagement by the peripheral surface of the cam, and wherein the cam carries a second roller extending through a longitudinal slot formed in the crank arm.

References Cited by the Examiner

UNITED STATES PATENTS 3,228,286   1/1966   Jarvis.

NORTON ANSHER, *Primary Examiner.*

C. R. RHODES, *Assistant Examiner.*